(12) United States Patent
Lai

(10) Patent No.: US 9,089,110 B2
(45) Date of Patent: Jul. 28, 2015

(54) ANIMAL HARNESS DEVICE

(71) Applicant: Fong-O Lai, Taichung (TW)

(72) Inventor: Fong-O Lai, Taichung (TW)

(*) Notice: Subject to any disclaimer, the term of this patent is extended or adjusted under 35 U.S.C. 154(b) by 37 days.

(21) Appl. No.: 14/108,590

(22) Filed: Dec. 17, 2013

(65) Prior Publication Data

US 2015/0164049 A1 Jun. 18, 2015

(51) Int. Cl.
*A01K 27/00* (2006.01)

(52) U.S. Cl.
CPC .................. *A01K 27/002* (2013.01)

(58) Field of Classification Search
CPC .................................... A01K 27/002
USPC .......................... 119/769, 492, 856
See application file for complete search history.

(56) References Cited

U.S. PATENT DOCUMENTS

| 5,247,905 | A | * | 9/1993 | Arakawa | 119/863 |
|---|---|---|---|---|---|
| 6,688,260 | B2 | | 2/2004 | Morrison | |
| 6,694,923 | B1 | | 2/2004 | Fouche | |
| 7,017,527 | B2 | | 3/2006 | Price | |
| 7,165,511 | B1 | * | 1/2007 | Brezinski | 119/792 |
| 7,461,615 | B2 | | 12/2008 | Albright | |
| 8,051,808 | B2 | * | 11/2011 | Mugford | 119/792 |
| 2008/0105216 | A1 | * | 5/2008 | Sporn | 119/863 |
| 2014/0020634 | A1 | * | 1/2014 | Kissel, Jr. | 119/712 |

\* cited by examiner

*Primary Examiner* — Kristen C Hayes
(74) *Attorney, Agent, or Firm* — Charles E. Baxley

(57) ABSTRACT

An animal harness device includes a base tether for engaging onto an animal, a carrying strap has two end portions coupled to the end portions of the base tether, a slidable ring member engaged onto the carrying strap and movable along the carrying strap, two connecting members attached to the end portions of the base tether and each connecting member include an outer slot and an inclined slot offset from each other and inclined relative to each other, a neck band is coupled to the inclined slots of the connecting members and adjustable relative to the base tether, a body band is coupled to the outer slots of the connecting members, and a leash cord has a connector detachably engaged with the slidable ring member for walking the animal.

11 Claims, 3 Drawing Sheets

ANIMAL HARNESS DEVICE

BACKGROUND OF THE INVENTION

1. Field of the Invention

The present invention relates to an animal harness device, and more particularly to an animal harness device including an improved structure or configuration for solidly and stably and snugly attaching or mounting or securing or engaging onto an animal and for preventing the animal harness device from slipping or moving relative to the animal and for preventing the animal from feeling uncomfortable.

2. Description of the Prior Art

Various kinds of typical animal harness devices have been developed and provided for attaching or mounting or securing or engaging onto one or more animals and for allowing the animals to be solidly and stably pulled or carried with the user, and normally comprise a neck band and/or a body or chest band for attaching or engaging onto the neck portion and/or the body or chest portion of the animals.

For example, U.S. Pat. No. 6,688,260 to Morrison, U.S. Pat. No. 6,694,923 to Fouche, U.S. Pat. No. 7,017,527 to Price, and U.S. Pat. No. 7,461,615 to Albright disclose several of the typical animal harness devices or pet leash apparatuses each also comprising a neck band and/or a body or chest band for attaching or engaging onto the neck portion and/or the body or chest portion of the animals.

However, the leash members or strap elements or cord or tether members of the typical animal harness devices or pet leash apparatuses may not be solidly and stably attached or mounted or secured or engaged onto the pets or animals and may slip or move relative to the animals such that the animals may feel uncomfortable while wearing the typical animal harness devices or pet leash apparatuses.

The present invention has arisen to mitigate and/or obviate the afore-described disadvantages of the conventional animal harness devices or pet leash apparatuses.

SUMMARY OF THE INVENTION

The primary objective of the present invention is to provide an animal harness device including an improved structure or configuration for solidly and stably and snugly attaching or mounting or securing or engaging onto an animal and for preventing the animal harness device from slipping or moving relative to the animal and for preventing the animal from feeling uncomfortable.

In accordance with one aspect of the invention, there is provided an animal harness device comprising a base tether for engaging onto an animal, the base tether including two end portions, a carrying strap having two end portions coupled to the end portions of the base tether respectively for connecting to the base tether, a slidable ring member slidably engaged onto the carrying strap and movable along the carrying strap, two connecting members attached to the end portions of the base tether respectively, and each connecting member including an outer slot formed in the connecting member, and an inclined slot formed in the connecting member and offset from the outer slot of the connecting member and inclined relative to the outer slot of the connecting member, a neck band coupled to the inclined slots of the connecting members, the neck band including a buckle and a keeper engaged onto the neck band for adjusting the neck band relative to the base tether to a different length, a body band coupled to the outer slots of the connecting members, the body band including a buckle and a keeper engaged onto the neck band for adjusting the neck band relative to the base tether to a different length, and a leash cord including a connector detachably engaged with the slidable ring member for walking the animal.

The base tether includes two end loops formed on the ends and coupled to the connecting members respectively. The connecting members each include an inner slot formed therein and engaged with the end loops of the base tether respectively for attaching the connecting members to the base tether.

The inner slot of the connecting member is offset from the outer slot of the connecting member and parallel to the outer slot of the connecting member, and inclined relative to the inclined slot of the connecting member. The base tether further includes two mounting ring members attached to the end portions of the base tether respectively and coupled to the end portions of the carrying strap respectively.

A first or female fastening element may further be provided and may be engaged with the inclined slot of one of the connecting members, and a second or male fastening element is coupled to a free end of the neck band for engaging with the first fastening element. The first fastening element is selected from a female fastening element or the like, and the second fastening element is selected from a male fastening element or the like for engaging with the female fastening element.

Another first or female fastening element may further be provided and may be engaged with the outer slot of one of the connecting members, and another male fastening element is coupled to a free end of the body band for engaging with the first fastening element. The first fastening element is selected from a female fastening element or the like, and the second fastening element is selected from a male fastening element or the like for engaging with the female fastening element.

A pad or cushioning member may further be provided and includes at least one anchoring loop formed thereon for engaging with the neck band and for solidly or stably attaching or securing onto the neck band. Another cushioning member may further be provided and includes at least one anchoring loop formed thereon for engaging with the body band and for attaching onto the body band.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figures 6, 7:
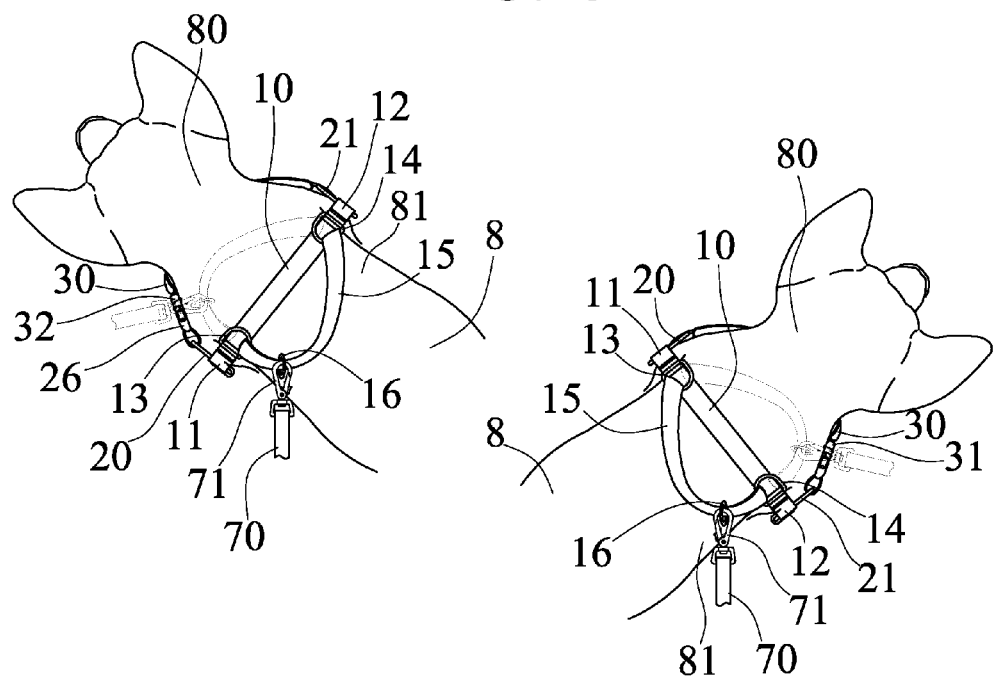
FIGS. 6, 7 are further top plan schematic views illustrating the operation of the animal harness device.

Referring to the drawings, and initially to FIGS. 1-4, an animal harness device 1 in accordance with the present invention comprises a base or main or primary webbing or tether 10 for attaching or mounting or securing or engaging onto the back portion and/or the shoulder portion of an animal 8 (FIGS. 1 and 4-7), two end loops 11, 12 formed or provided on the two end portions of the base tether 10, two first or mounting ring members 13, 14 attached or mounted or secured or engaged onto the two end portions of the base tether 10, a carrying strap 15 having two end portions attached or mounted or secured or coupled or engaged with the ring members 13, 14 for being connected or coupled to the base tether 10, and another or second or slidable ring member 16 slidably attached or mounted or engaged onto the carrying strap 15 and movable along the carrying strap 15 (FIGS. 6, 7).

Figure 1:
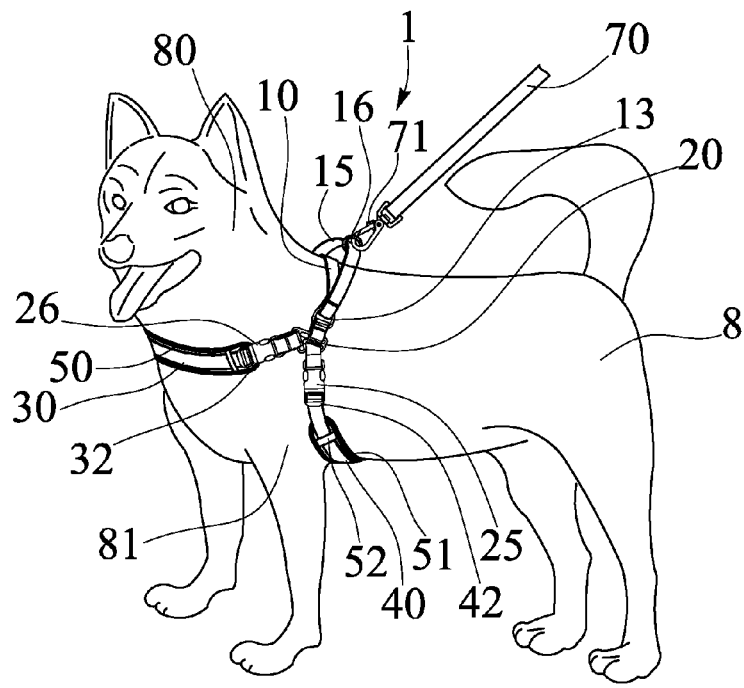
FIG. 1 is a perspective view illustrating the operation of an animal harness device in accordance with the present invention.
Figure 2:
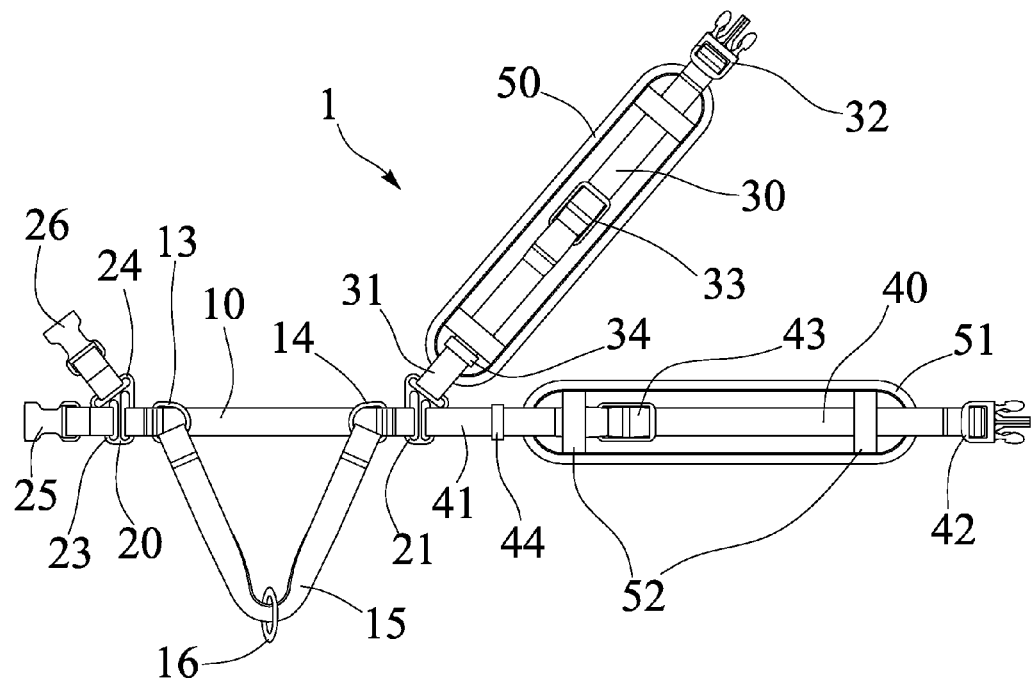
FIG. 2 is a top plan schematic view of the animal harness device.
Figure 3:
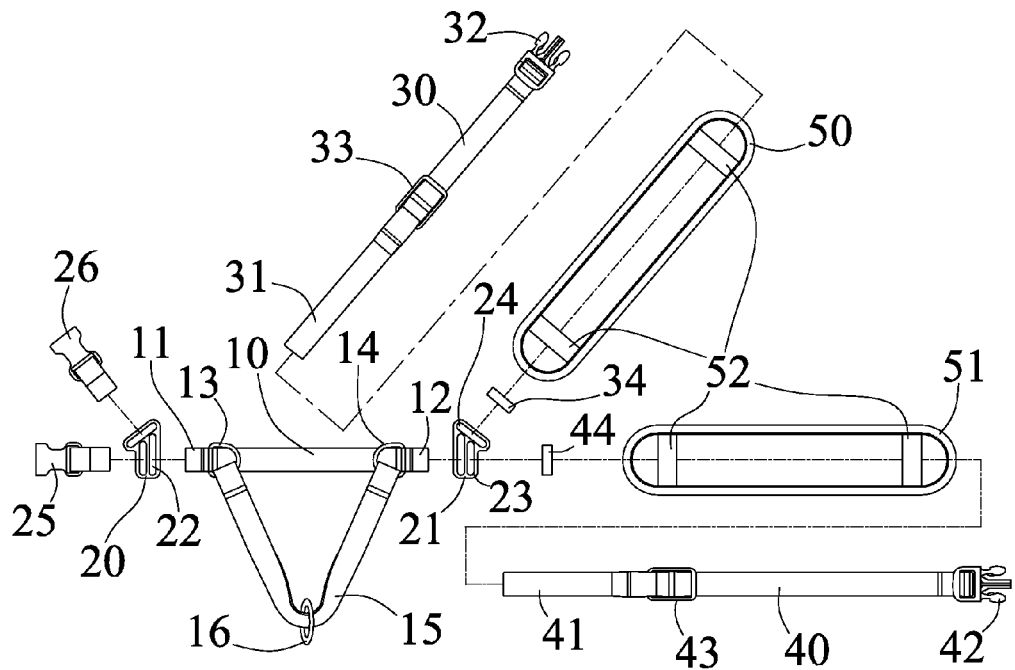
FIG. 3 is a partial exploded view of the animal harness device.
Figure 4:
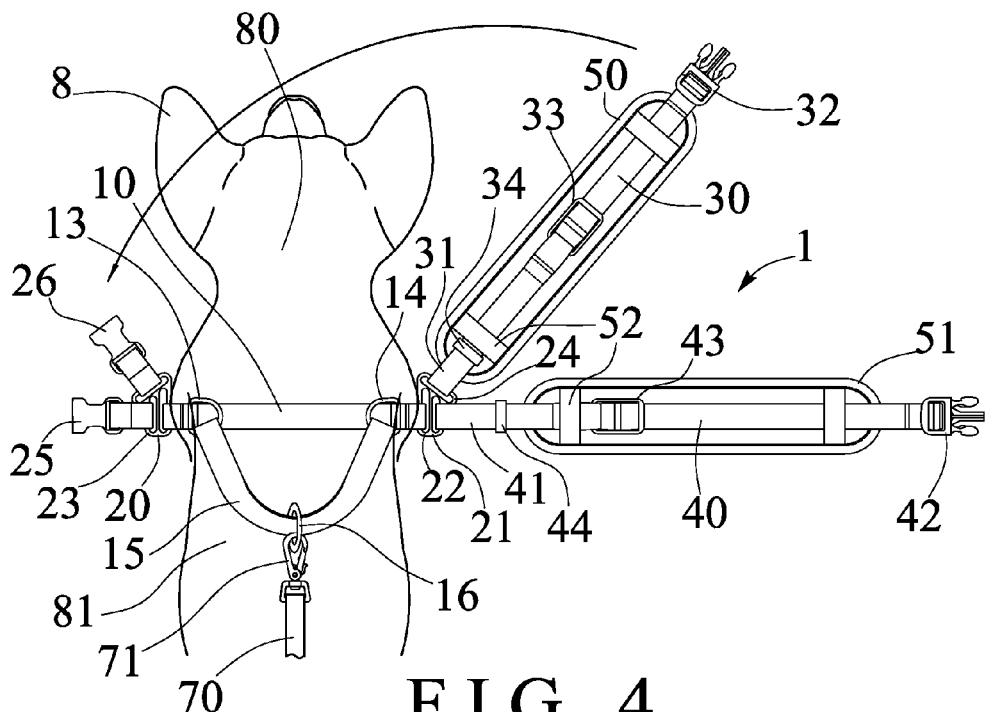
FIGS. 4, 5 are top plan schematic views similar to FIG. 2, illustrating the operation of the animal harness device.
Figure 5:
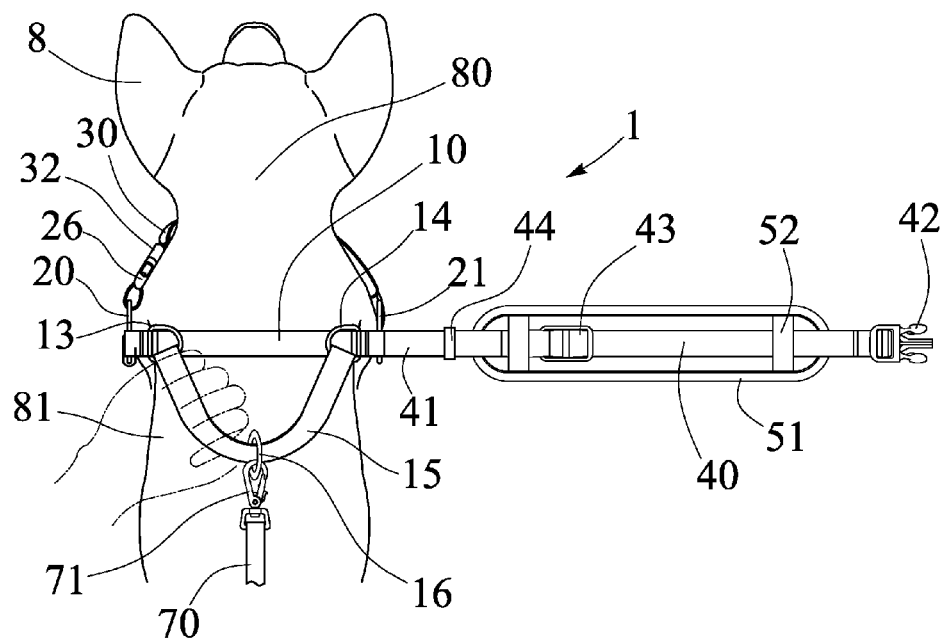

Two connecting members or rings 20, 21 each include an inner groove or channel or slot 22 formed therein for receiving or threading or engaging with the loops 11, 12 of the base tether 10 respectively and for attaching or mounting or securing or coupling to the base tether 10, and each include an outer groove or channel or slot 23 formed therein and spaced or separated or offset, and preferable, but not necessary parallel to the inner slot 22 of the connecting member 20, 21, and each include an additional or tilted or inclined groove or channel or slot 24 formed therein and also spaced or separated or offset from the slots 22, 23 of the connecting member 20, 21 and tilted or inclined relative to the slots 22, 23 of the connecting member 20, 21, best shown in FIG. 3.

Two first connecting or fastening buckles or latches or elements 25, 26, such as female fastening elements 25, 26 are attached or mounted or secured or coupled to or engaged with the outer slot 23 and the inclined slot 24 of the connecting member 20, 21 respectively, a neck belt or cord or band 30 includes one end portion or middle or intermediate portion 31 slidably threaded or engaged with the inclined slot 24 of one of the connecting members 21, and includes another or second fastening buckle or latch or element 32, such as male fastening element 32 attached or mounted or secured or coupled to the outer or free end portion of the neck band 30 for engaging with the female fastening element 26 and for detachably attaching or mounting or securing or engaging onto the neck portion 80 of the animal 8, and includes a buckle 33 and/or a keeper 34 attached or mounted or engaged onto the neck band 30 for adjusting the neck band 30 relative to the base tether 10 and the neck portion 80 of the animal 8 to a different length, and for solidly and stably and snugly attaching or mounting or securing or engaging onto the neck portion 80 of the animal 8.

A breast or chest or body belt or cord or band 40 includes one end portion or middle or intermediate portion 41 slidably threaded or engaged with the inclined slot 23 of one of the connecting members 21, and includes a further fastening buckle or latch or element 42, such as male fastening element 42 attached or mounted or secured or coupled to the outer or free end portion of the body band 40 for engaging with the female fastening element 25 and for detachably attaching or mounting or securing or engaging onto the breast or chest or body portion 81 of the animal 8, and includes a buckle 43 and/or a keeper 44 attached or mounted or engaged onto the body band 40 for adjusting the body band 40 relative to the base tether 10 and the body portion 81 of the animal 8 to a different length, and for solidly and stably and snugly attaching or mounting or securing or engaging onto the body portion 81 of the animal 8, such that the base tether 10 and the neck band 30 and the body band 40 may be solidly and stably and snugly attached or mounted or secured or engaged onto the neck portion 80 and the body portion 81 of the animal 8.

One or more (such as two) pads or cushioning members 50, 51 may further be provided and attached or mounted or secured or engaged onto the neck band 30 and the body band 40 respectively, and softly and resiliently and comfortably contacted or engaged with the neck portion 80 and/or the body portion 81 of the animal 8 for allowing the animals 8 to feel more comfortable. For example, the cushioning members 50, 51 each include one or more (such as two) latching or catching or anchoring or retaining or positioning belt or strap or loop or member 52 formed or provided thereon for threading or engaging with the neck band 30 and the body band 40 respectively, and for solidly and stably attaching or mounting or securing or latching or catching or anchoring or retaining or positioning the cushioning members 50, 51 to the neck band 30 and the body band 40 respectively.

A carrying belt or leash cord 70 may further be provided and includes a connecting hook or catch or latch or snap hook or connector 71 for detachably attaching or mounting or securing or engaging onto or with the ring member 16 for pulling or carrying or walking the pet or animal 8. As best shown in FIGS. 6 and 7, the ring member 16 and thus the connector 71 of the leash cord 70 may be slid or moved along the carrying strap 15, particularly when the pet or animal 8 moves here and there, for preventing the leash cord 70 from being entangled or wound or engaged onto or around the neck portion 80 and/or the body portion 81 of the animal 8. It is to be noted that the base tether 10 and the neck band 30 and the body band 40 may be solidly and stably and snugly attached or mounted or secured or engaged onto the neck portion 80 and the body portion 81 of the animal 8 with the connecting members 20, 21, without slipping or moving relative to the animal.

Accordingly, the animal harness device in accordance with the present invention includes an improved structure or configuration for solidly and stably and snugly attaching or mounting or securing or engaging onto an animal and for preventing the animal harness device from slipping or moving relative to the animal and for preventing the animal from feeling uncomfortable.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An animal harness device comprising:
   a base tether for engaging onto an animal, the base tether including two end portions,
   a carrying strap having two end portions coupled to the end portions of the base tether respectively for connecting to the base tether,
   a slidable ring member slidably engaged onto the carrying strap and movable along the carrying strap,
   two connecting members attached to the end portions of the base tether respectively, and each connecting member including an outer slot formed in the connecting member, and an inclined slot formed in the connecting member and offset from the outer slot of the connecting member and inclined relative to the outer slot of the connecting member,
   a neck band coupled to the inclined slots of the connecting members, the neck band including a buckle and a keeper engaged onto the neck band for adjusting the neck band relative to the base tether to a different length,
   a body band coupled to the outer slots of the connecting members, the body band including a buckle and a keeper engaged onto the neck band for adjusting the neck band relative to the base tether to a different length, and
   a leash cord including a connector detachably engaged with the slidable ring member for walking the animal.

2. The animal harness device as claimed in claim 1, wherein said base tether includes two end loops coupled to the connecting members respectively.

3. The animal harness device as claimed in claim 2, wherein said connecting members each include an inner slot formed therein and engaged with the end loops of the base tether respectively for attaching to the base tether.

4. The animal harness device as claimed in claim 3, wherein said inner slot of said connecting member is offset from the outer slot of the connecting member and parallel to the outer slot of the connecting member, and inclined relative to the inclined slot of the connecting member.

5. The animal harness device as claimed in claim 1, wherein said base tether includes two mounting ring members attached to the end portions of the base tether respectively and coupled to the end portions of the carrying strap respectively.

6. The animal harness device as claimed in claim 1, wherein a first fastening element is engaged with the inclined slot of one of said connecting members, and a second fastening element is coupled to a free end of the neck band for engaging with the first fastening element.

7. The animal harness device as claimed in claim 6, wherein said first fastening element is selected from a female fastening element, and said second fastening element is selected from a male fastening element for engaging with the female fastening element.

8. The animal harness device as claimed in claim 1, wherein a first fastening element is engaged with the outer slot of one of said connecting members, and a second fastening element is coupled to a free end of the body band for engaging with the first fastening element.

9. The animal harness device as claimed in claim 8, wherein said first fastening element is selected from a female fastening element, and said second fastening element is selected from a male fastening element for engaging with the female fastening element.

10. The animal harness device as claimed in claim 1, wherein a cushioning member includes at least one anchoring loop formed thereon for engaging with the neck band and for attaching onto the neck band.

11. The animal harness device as claimed in claim 1, wherein a cushioning member includes at least one anchoring loop formed thereon for engaging with the body band and for attaching onto the body band.

\* \* \* \* \*